United States Patent [19]

Froeschle et al.

[11] E Patent Number: Re. 31,679

[45] Reissued Date of Patent: Sep. 18, 1984

[54] LOUDSPEAKER ENCLOSURE WITH ACOUSTICAL COMPLIANCE RESONATING WITH PORT MASS AT FREQUENCY BELOW SYSTEM RESONANCE

[75] Inventors: Thomas A. Froeschle, Southborough; William P. Schreiber, Ashland, both of Mass.

[73] Assignee: Bose Corporation, Framingham, Mass.

[21] Appl. No.: 344,353

[22] Filed: Feb. 1, 1982

Related U.S. Patent Documents

Reissue of:

[64] Patent No.: 4,146,745
Issued: Mar. 27, 1979
Appl. No.: 719,943
Filed: Sep. 2, 1976

U.S. Applications:

[63] Continuation of Ser. No. 82,299, Oct. 5, 1979, abandoned.

[51] Int. Cl.[3] ..... H04R 1/28

[52] U.S. Cl. ..... 381/89; 179/101; 181/145; 181/147; 181/156; 381/98; 381/103; 381/111

[58] Field of Search ..... 179/1 E; 181/144–148, 181/151, 156

[56] References Cited

U.S. PATENT DOCUMENTS 3,233,696 2/1966 Mercurius ..... 181/145

FOREIGN PATENT DOCUMENTS 1527032 5/1968 France ..... 179/1 E

*Primary Examiner*—George G. Stellar
*Attorney, Agent, or Firm*—Charles Hieken

[57] ABSTRACT

A multiple driver loudspeaker system comprises two angularly spaced rear rectangular baffles each nearly filled with four closely spaced full-range small loudspeakers with a port tube passing through the center of each rear baffle and the junction therebetween. A front baffle carries a small centrally located loudspeaker. The front loudspeaker is backed by a cavity that is vented through the port tube at the intersection between the rear baffles. Each of the remaining loudspeakers is backed by a cavity with the four cavities associated with each rear baffle being vented through the associated port tube through channels located at the front of each cavity. Two bullets are cantilevered from the front baffle rearward and essentially concentric within the respective centrally located ports. The volume of each of the nine cavities is substantially the same. The nine loudspeakers are connected in phase and in series and energized through an active equalizer having a sharp low-frequency cutoff that prevents the loudspeakers from being energized with appreciable energy much below the port tube and cavity resonance of each ported enclosure, typically 40 Hz while coacting with the loudspeakers to provide substantially uniform acoustic power radiation over substantially the full audio frequency range. In an alternative embodiment of the invention there is a common cavity behind eight drivers, and a pair of port tubes include damping material inside to lower the Q of the resonant elements comprising the cavity and port tubes.

33 Claims, 10 Drawing Figures

LOUDSPEAKER ENCLOSURE WITH ACOUSTICAL COMPLIANCE RESONATING WITH PORT MASS AT FREQUENCY BELOW SYSTEM RESONANCE

Matter enclosed in heavy brackets [ ] appears in the original patent but forms no part of this reissue specification; matter printed in italics indicates the additions made by reissue.

*REFERENCE TO PRIOR COPENDING APPLICATION*

*This is a continuation of reissue application Ser. No. 82,299 filed Oct. 5, 1979, now abandoned.*

BACKGROUND OF THE INVENTION

The present invention relates in general to loudspeaker systems and more particularly concerns a novel loudspeaker system characterized by unusually realistic reproduction of sound that is compact and relatively easy and inexpensive to manufacture in large quantities while maintaing good quality control and producing relatively high sound levels in response to relaively low input electrical power levels. The present invention achieves the performance level of the internationally famous BOSE 901 DIRECT/REFLECTING loudspeaker system described in Bose U.S. Pat. No. 3,582,553 and embodies the principles of that patented invention and the invention described in Bose U.S. Pat. No. 3,038,964.

Both that system and a preferred embodiment of this system include eight speakers on a pair of rear panels or baffles that each form an angle of about 30° with the wall upon which the rear speakers direct their sound and one speaker on the front panel or baffle that faces the normal listening area. This arrangement radiates the desired ratio of about 8:1 reflected sound to direct sound while projecting the image of a musical performance located on a stage that is about a foot behind the wall when the enclosure is about a foot in front of the wall so that it is possible to hear the full stereo spread from a wide range of listening positions including directly in front of one enclosure. That system and a preferred embodiment of the present invention also both include an active equalizer for establishing essentially uniform acoustic power radiation as a function of frequency over substantially the entire audio frequency range.

The BOSE 901 loudspeaker system has received an unprecedented series of rave reviews in the United States and many other countries. While that system performs well when driven with power amplifiers of moderate capacity, higher power amplifiers are required to produce high acoustic levels at the lower audio frequencies.

It is known in the prior art to use ported enclosures to obtain higher acoustic power levels at lower frequencies with a given electrical input power. And a simple port works satisfactorily in a conventional woofer-tweeter loudspeaker system and is used, for example, in the BOSE Model 301 DIRECT/REFLECTING loudspeaker system. However, it was discovered that simply porting the loudspeaker cabinet in the system described in U.S. Pat. No. 3,582,553 did not provide [satisfatory] *satisfactory* performance. It was discovered that in the vicinity of port resonance all the small loudspeakers did not operate in phase with the result that the excursions of the drivers working together increased to compensate for the excursions of the out-of-phase drivers, causing the drivers to enter the nonlinear region of operation at relatively modest [and] sound levels.

Accordingly, it is an important object of this invention to provide an improved loudspeaker system.

It is another object of the invention to achieve the preceding object while retaining all the performance advantages of the BOSE 901 loudspeaker system described in U.S. Pat. No. 3,582,553.

It *is* a further object of the invention to achieve one or more of the preceding objects while increasing the ratio of acoustic power radiated to input electrical power in the bass frequency range.

It is a further object of the invention to achieve one or more of the preceding objects [witha] *with a* compact ported cabinet.

It is still a further object of the invention to achieve one or more of the preceding objects with a structure that is relatively inexpensive and easy to manufacture through mass production techniques while maintaining high quality control.

It is a further object of the invention to achieve one or more of the preceding objects with multiple in-phase-connected full-range loudspeakers in a ported enclosure while solving the problem noted above.

SUMMARY OF THE INVENTION

According to the invention, there are a plurality of loudspeaker driver means connected in phase, port tube or drone cone means for coacting with cavity means to establish a cavity-port-tube or drone cone resonant frequency in the low range of audio frequencies, and means for preventing the driver means cones from moving out-of-phase in the low range of audio frequencies where the port-tube or drone cone means is effective in reducing driver cone excursions.

According to a more specific form of the invention, there are a plurality of loudspeaker driver means connected in phase, means defining a cavity associated with each loudspeaker driver means, port tube means for venting the cavity to the outside, and aperture defining means defining apertures between each cavity and the port tube means for coupling the cavities to the port tube means. Preferably the loudspeaker driver means are like in-phase-connected full-range drivers typically connected in series closing the associated cavities at an end thereof opposite the end near which the coupling aperture is located with the port tube means venting to the outside through a port opening in a baffle carrying the associated drivers clustered thereabout. Preferably, there are two rear angled baffles each carrying a cluster of four drivers surrounding a respective port opening. Preferably, there is a front baffle carrying a single driver connected in phase with the other drivers closing one end of a cavity and vented through a tube at the other end passing through the junction between the two rear baffles. Preferably, the volume of each cavity is substantially equal to that of all the others. Preferably, there is a bullet means concentric within each port tube means and [cabntilevered] *cantilevered* from the front baffle coacting with the surrounding port tube means to comprise means for establishing laminar air flow within the tube means. Preferably, there is active electrical equalizing means coacting with the loudspeaker drivers and assembly for establishing substantially uniform acoustic power radiation as a function of frequency over substantially the full audio frequency range and characteristized by a sharp cutoff below a frequency corresponding substantially to the port tube-cavity resonant frequency typically at substantially 40 Hz. Preferably, the means defining the cavities, the tube means and the bullets comprise molded plastic components.

According to one aspect of the invention, the cavity defining means comprise means for preventing the driver means cones from moving out-of-phase. According to another aspect of the invention, Q-reducing means for reducing the Q of the resonant system comprising cavity defining means and port tube means comprises means for preventing out-of-phase cone movement.

Numerous other features, objects and advantages of the invention will become apparent from the following specification when read in connection with the accompanying drawing in which:

DETAILED DESCRIPTION OF PREFERRED EMBODIMENTS

Figure 1:
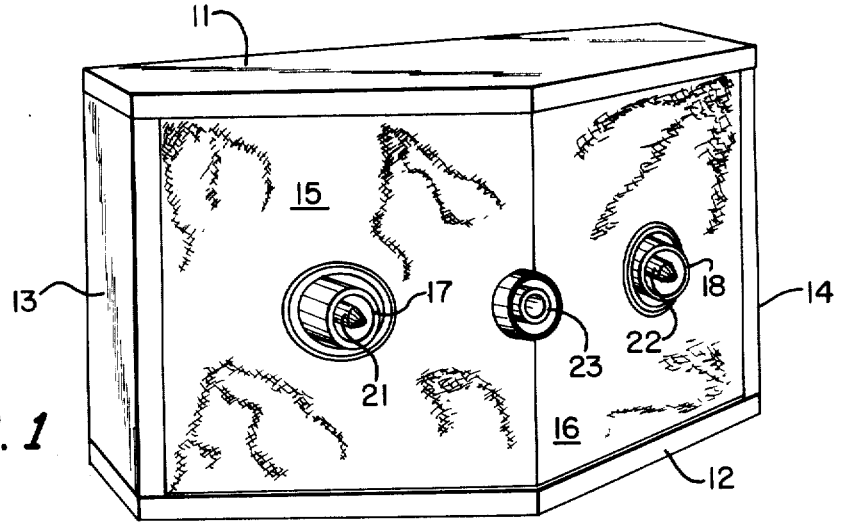
FIG. 1 is a perspective view of a loudspeaker assembly accoding to the invention showing the three rear-venting port tubes.

With reference now to the drawing and more particularly FIG. 1 thereof, there is shown a perspective view of a loudspeaker assembly according to the invention as seen from the left rear. The assembly includes top, bottom, left and right panels 11, 12, 13 and 14, respectively. Left and right grills 15 and 16, respectively, cover respective angled rear baffles 52 and 33 that each carry four closely-spaced full-range drivers connected in series (FIG. 5) through which left and right port tubes 17 and 18, respectively protrude for venting four cavities behind each respective baffle as described below. Left and right port tubes 17 and 18 surround respective concentric tapered left and right bullets 21 and 22 that comprise means for establishing laminar air flow in the annular region of slightly tapered radial width between the bullet and the surrounding tube.

Figure 2:
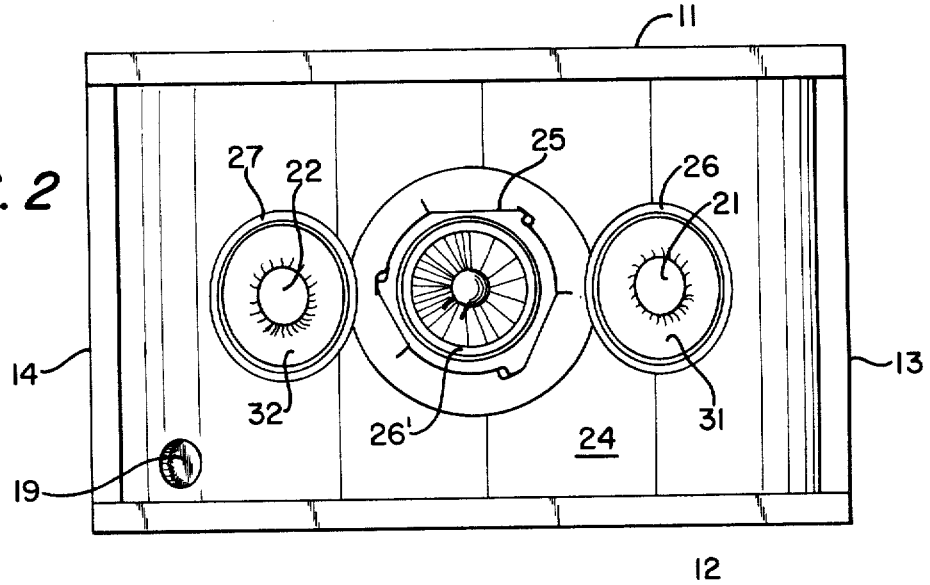
FIG. 2 is a front view of a loudspeaker assembly according to the invention with the front grill cloth removed to show the mounting of the front driver and the base of the bullets that are cantilevered from the front baffle into the port tubes of the rear drivers.

A central port tube 23 protrudes through a collar 28 defining a port opening in a junction between the rear baffles for venting the cavity behind the driver on the front baffle (FIG. 2).

Referring to FIG. 2, there is shown a front view of a loudspeaker assembly according to the invention with the front grill cloth removed to illustrate certain structural features. The same reference symbols identify corresponding elements throughout the drawing. The front baffle 24 is preferably made of high impact plastic, such as styrene, and formed with a central opening 25 for accommodating front loudspeaker driver 26' and left and right openings 26 and 27, respectively, surrounded by annular rims (not visible in FIG. 2) to which the bases 31 and 32 of left and right bullets 21 and 22 are secured to cantilever bullets 21 and 22 from front baffle 24. Recess 19 is for accommodating the fastener that secures a logo to the front of the assembly.

Figure 3:
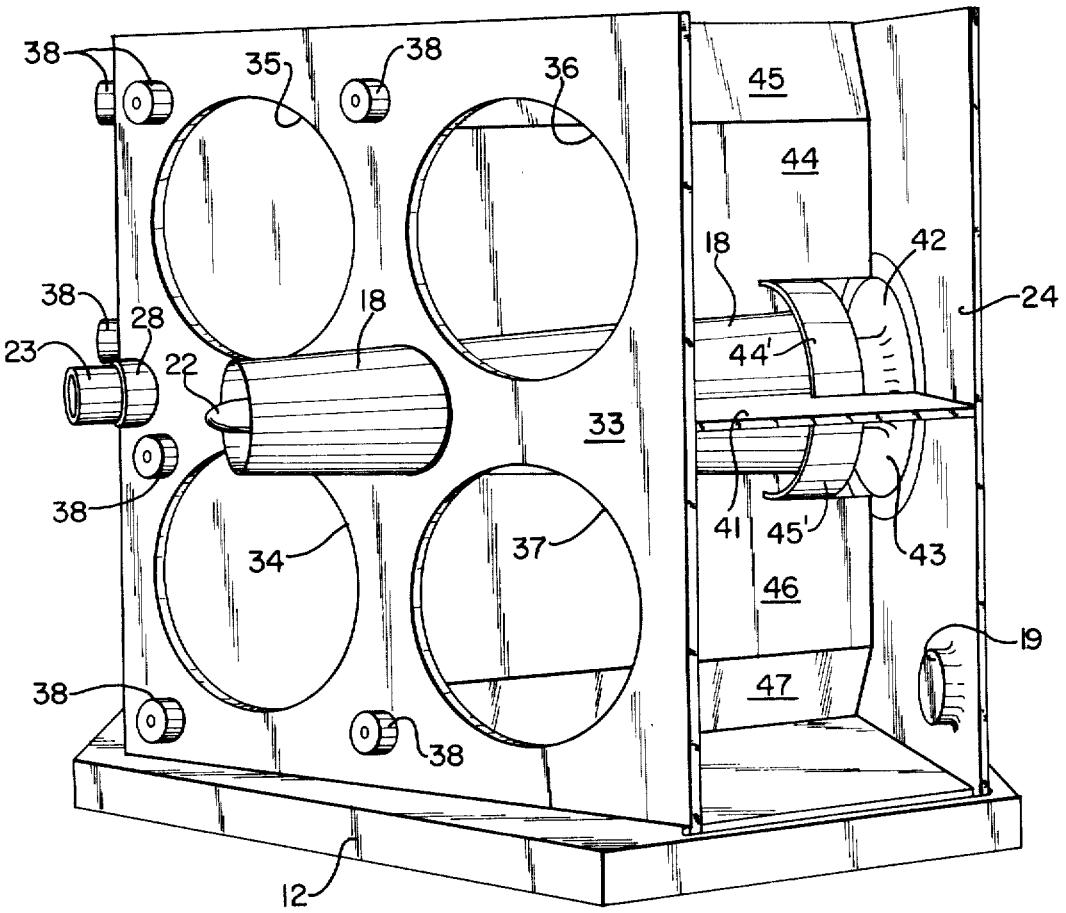
FIG. 3 is a perspective view of an enclosure as seen from the right rear without the top and sides.

Referring to FIG. 3, there is shown a perspective view of an assembly according to the invention without the top and side panels as seen from the right rear illustrating structure defining the respective cavities for the rear drivers. Right rear baffle 33 is formed with four openings 34, 35, 36 and 37, for accommodating respective drivers, each at one end of a respective cavity closed at the other end by front baffle 24. A horizontal partition 41 and portions of port tube 18 separate the cavity behind opening 36 from the cavity behind opening 37, and apertures 42 and 43, respectively, couple these cavities into the entrance of port tube 18 adjacent front baffle 24 over lip portions 44' and 45', respectively, that help establish a smooth flow of air from each cavity into the associated port tube. The area of each of aperatures 42 and 43 is large enough to avoid audible noises when reproducing passages in the low [bas] *bass* region while being small enough to prevent acoustical coupling between drivers. A suitable cross sectional area for each aperture is 2.25 square inches. The aperature areas were established by pushing the tubes as close to the front baffle as practical without producing undesired audible noises when the drivers were energized with a low frequency signal. Studs 38 are for receiving staples to secure the grill cloth assembly.

Vertical partition 44 and inwardly sloping partition 45 isolate the cavity before opening 36 from the cavity before opening 35. Similarly vertical partition 46 and downwardly and inwardly sloping partition 47 isolate the cavity before opening 37 from the cavity before opening 34. It is desired that the cavity behind each driver be of substantially the same volume. By making panels 45 and 47 slope inwardly, cavity volume is added to the cavities adjacent the sides to compensate for the shorter span between front panel 24 and rear panel 33 for these cavities as compared with the cavities nearer the center.

Figure 4:
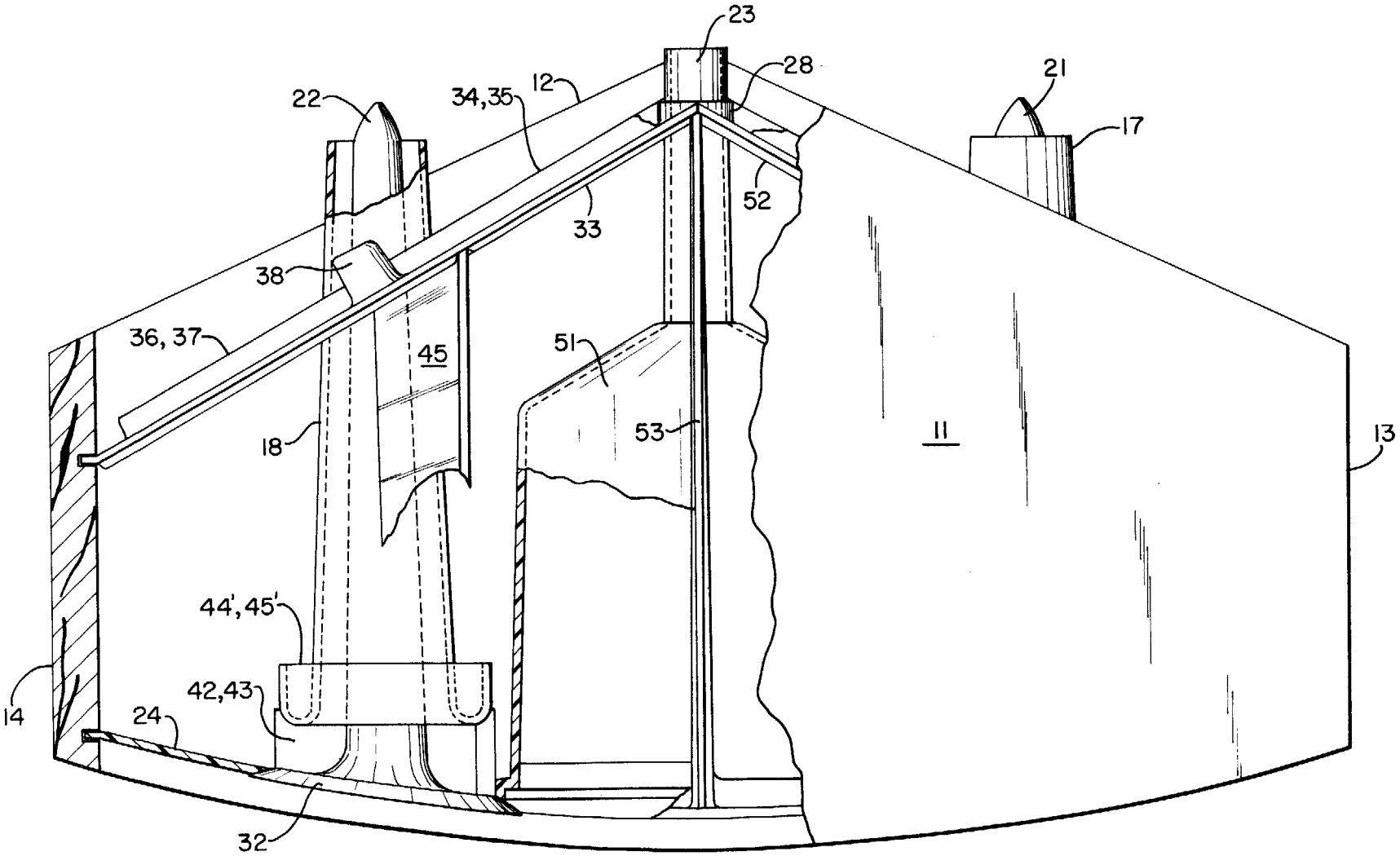
FIG. 4 is a top view of the assembly with portions cut away and some portions in section to illustrate the internal structure.

Referring to FIG. 4, there is shown a top view of the loudspeaker assembly according to the invention partially in section and with portions at different depths cut away to illustrate features of the invention. The cavity behind front driver 26 is defined by the generally cylindrical member 51 connected at the rear to separate port tube 23 that vents through collar 28 at the junction between the [twp] *two* angled rear panels 33 and 52. A vertical partition 53 extends above and below cylindrical member 51 and port tube 23 separates the cavities associated with the inner pairs of rear drivers.

The volume of generally cylindrical member 51 is substantially equal to the volume of each of the other eight cavities in the enclosure and coacts with port tube 23 to establish a cavity-port tube resonance of substantially 40 Hz. Each of the other cavities coacts with the associated port tube to establish a cavity-port tube or mass-compliance resonance of substantially 40 Hz.

While the invention may be practiced by fabricating the various partitions and other members as separate pieces, in a preferred form of the invention, the front baffle, the partition 53, the port tube 23 and the generally cylindrical member 51 is a unitary structure formed by injection molding, each rear baffle, the associated port tube and associated partitions is a unitary piece formed by injection molding, and the bullets are unitary pieces formed by injection molding. The preferred material is plastic. A feature of the invention is that only three molds are required, one for the front baffle assembly, a second for the rear baffles and a third for the bullets because bullets 21 and 22 are identical and rear baffles 33 and 52 are identical, collar 28 being formed of two semicircular portions that mate together. The result of this arrangement is high reproducibility at relatively low cost while establishing good acoustic properties.

A feature of the invention resides in having all the cavities vented toward the rear. It has been discovered that venting to the rear where the loudspeaker assembly is closer to the wall results in improved bass response as compared with the conventional approach of venting to the front. There is no problem with the wall obstructing the flow of air from the vents because the preferred position of the loudspeaker assembly is about a foot from an adjacent wall.

Figure 5:
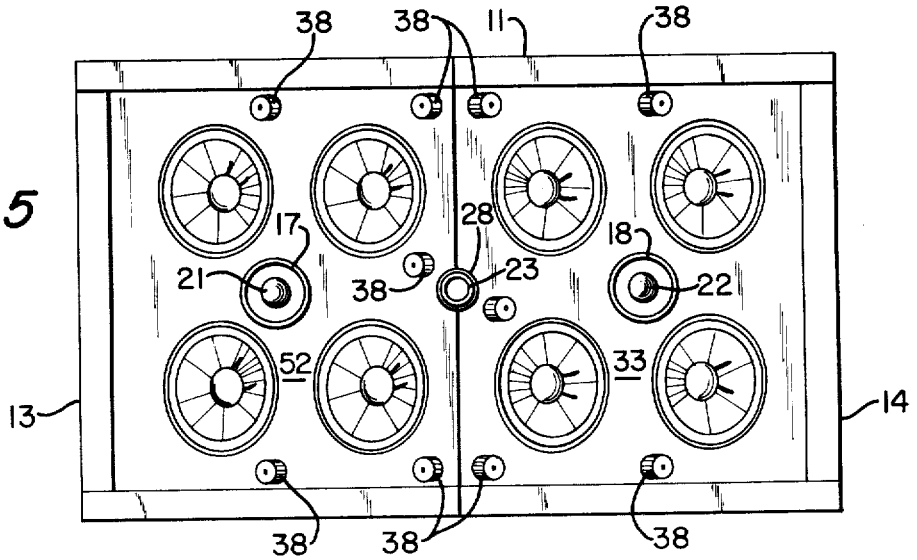
FIG. 5 is a rear view of a loudspeaker assembly according to the invention with the grill cloth removed.

Referring to FIG. 5, there is shown a rear view of the loudspeaker assembly with the rear grill cloth removed.

Figure 6:
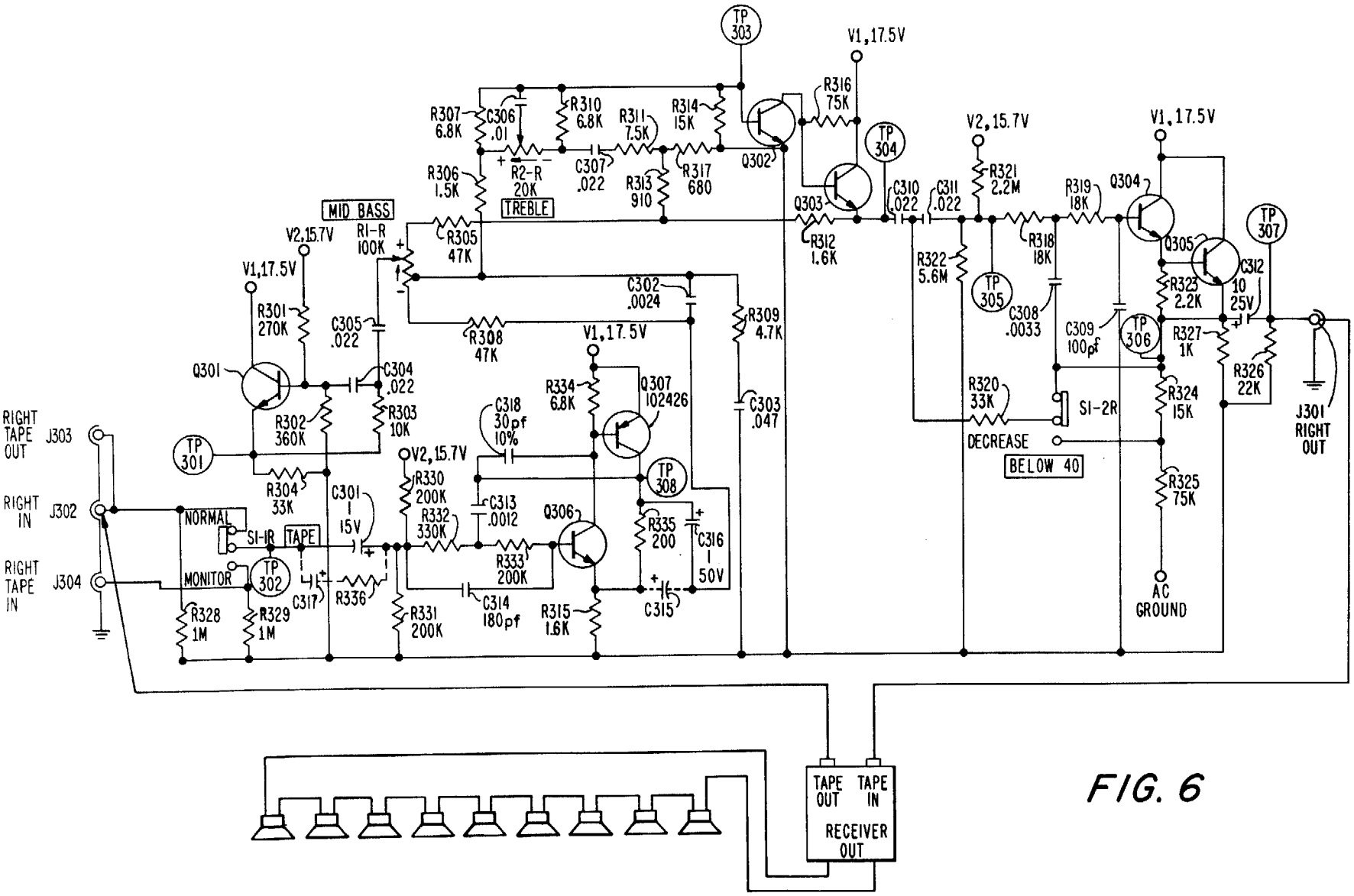
FIG. 6 is a combined block-schematic circuit diagram of one channel of a system according to the invention with a preferred form of active equalizer.

Referring to FIG. 6, there is shown a combined block-schematic circuit diagram of an exemplary embodiment of one channel of an active equalizer connected to a receiver for energizing nine drivers in series according to the invention. For stereo there are two of these channels. Representative parameter values are set forth.

Figure 7:
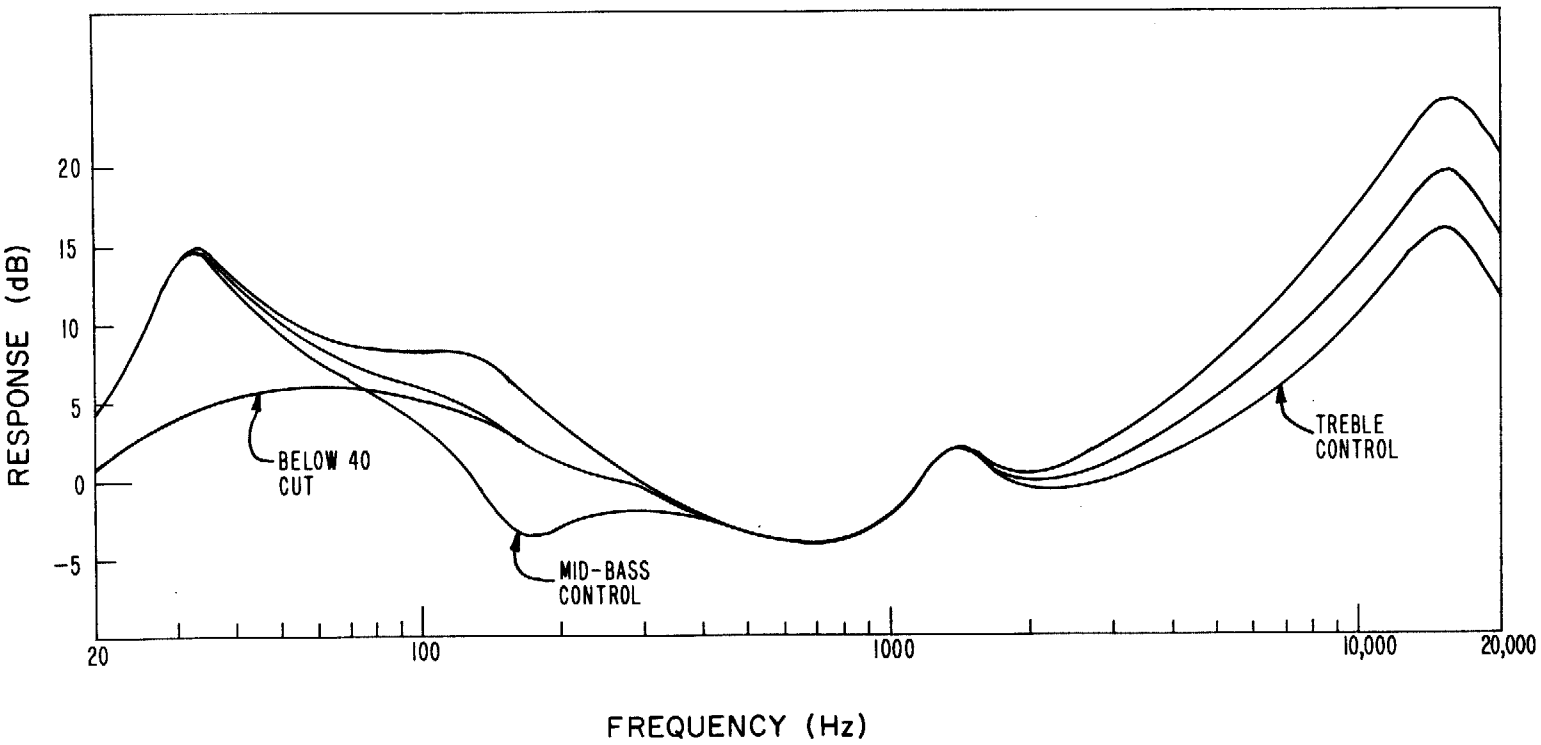
FIG. 7 is a graphical representation of typical responses of the equalizer of FIG. 6 plotted to a common frequency scale.

Referring to FIG. 7, there is shown a graphical representation as a function of frequency of the response of the active equalizer shown in FIG. 6 for the extreme settings of the mid-bass and treble controls, the middle curve being the normal setting and the effect of moving the below 40 switch to the decreased position. The circuitry includes a number of features. There is a 3-pole sharp cutoff network that effectively sharply cuts off the response below 32 Hz, a frequency slightly below the cavity-port tube resonance of about 40 Hz. Another feature is the compensation for driver rim resonance in the region between 1 and 2 kHz. Still another feature is the provision of the mid-bass control which affects the response between 100 and 300 Hz to accommodate for various listening environments and the treble control which affects the response only above 2 kHz.

Figure 8:
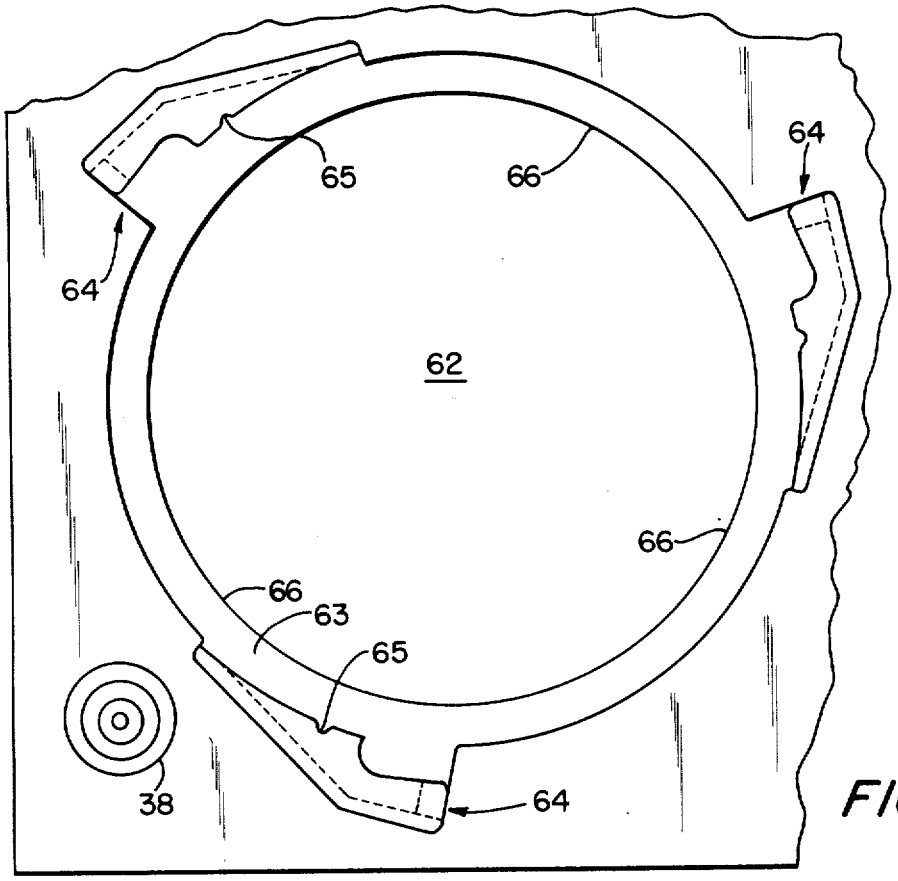
FIG. 8 is a fragmentary view of a baffle portion illustrating structural details of means for accommodating twist-and-lock driver assemblies.

Referring to FIG. 8, there is shown a portion of a baffle illustrating structural details preferably molded therein for accommodating twist-and-lock drivers. A baffle includes for each driver an opening 62 inside a depressed annular surface for accommodating a mating rear annular surface on a driver when the driver is mounted in opening 62. The diameter of opening 62 is just large enough to accommodate the portion of the driver basket rearward of the mating rear annular surface. Three equiangularly spaced recesses for accommodating mating tabs of a driver are defined by structures 64 open at the counterclockwise edges for receiving the driver tabs and are formed with notches 65 for mating engagement with corresponding protrusions on the driver to lock the driver in place when twisted fully clockwise. The span of the slit in a direction perpendicular to the baffle is preferably slightly less than the driver tab thickness so that rotating a driver clockwise until a driver protrusion mates with a notch 65 results in each tab being firmly engaged while the outside surface of a lip on the driver basket parallel to the driver axis snugly engages the wall portions 66 extending perpendicularly from the baffle to establish a substantially fluid-tight seal with a driver without gaskets, other soft material such as Mortite or screws to significantly reduce assembly costs while improving reliability.

Figure 9:
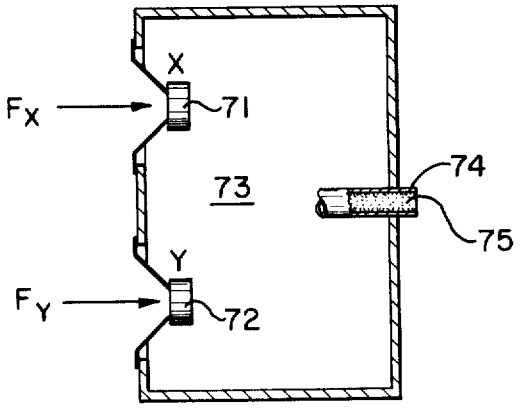
FIG. 9 is a diagramatic representation of an alternate embodiment of the invention having means for lowering the Q of a resonant system comprising acoustic compliance provided by a cavity and acoustic mass provided by port tubes.

Referring to FIG. 9, there is shown a diagramatic representation of an alternate embodiment of the invention in which a pair of drivers 71 and 72 [pratially] *partially* enclose a common cavity 73 vented through a port tube 74 having flocked material 75 or other suitable acoustic damping material for reducing the Q of the resonant system comprising cavity 73 and port tube 74. This aspect of the invention may also be embodied with a loudspeaker system of the type disclosed in U.S. Pat. No. 3,582,553 with all the drivers partially enclosing a common cavity and preferably having a port tube venting the common cavity through each rear panel, each port tube having flocked material or other suitable acoustic damping material inside the tube. In this embodiment the bullets may be omitted when properly designed in accordance with principles discussed below. Other means for reducing the Q may be practiced, for example, placing damping material inside or across one or both openings of the port tube, lining or filling the cavity with damping material, or other suitable means.

Figure 10:
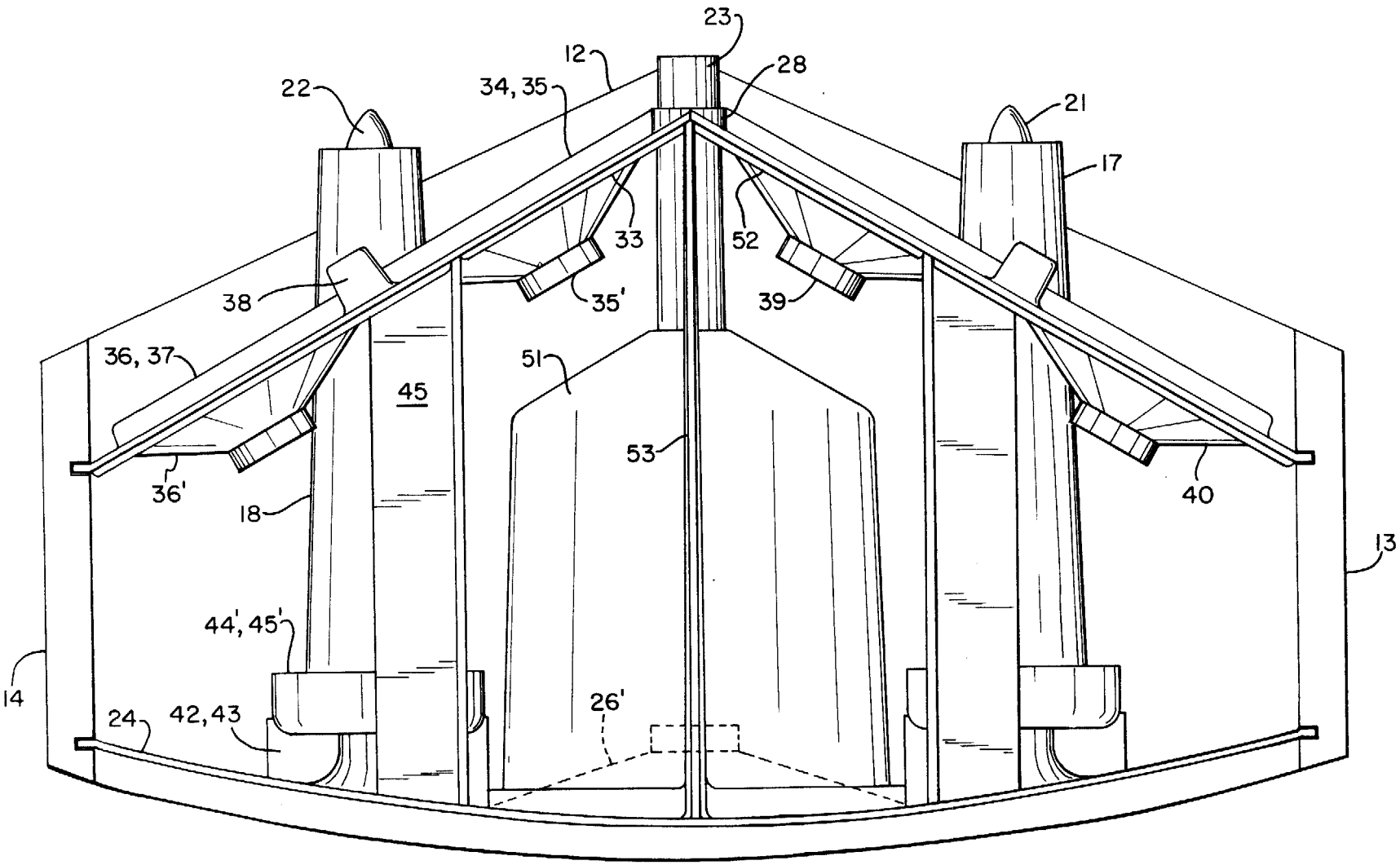
FIG. 10 is a top plan view of an assembled cabinet with drivers installed and the top removed.

Referring to FIG. 10, there is shown a top view of the cabinet shown in FIG. 4 with top panel 11 removed and rear upper drivers 35' and 36' visible seated in openings 35 and 36, respectively, and rear upper drivers 39 and 40 visible. Front driver 26' is shown in broken outline. The nine drivers are connected in phase in series as shown in FIG. 6.

Having described the physical arrangement of the invention and some important features, it is appropriate to consider certain principles of operation. One aspect of the invention is concerned with reducing cone excursion at a given sound level. An important function of the present invention is to improve the linear motion of the cones and significantly increase the dynamic range over which the loudspeaker system accurately reproduces the bass notes of musical instruments. To this end there are [14] *fourteen* principal regions inside the enclosure; the nine cavities behind the drivers, the three port tubes 17, 18 and 23 venting at the rear and the two mixing regions at the front of port tubes 17 and 18. At times the air in port tubes 17 and 18 moves faster than 60 miles an hour and would produce undesired audible noise in the absence of specific features of the invention that aerodynamically establish laminar flow in the mixing regions and inside tubes 17 and 18. To this end the front ends of tubes 17 and 18 present a [cruved] *curved* surface established by the folded-over front lip portion, and bullets 21 and 22 are formed as shown to have outer surfaces approaching the inside surfaces of tubes 17 and 18 at the rear ends, the front portion curved outwardly as shown to coact with the curved lip at tubes 17 and 18 to provide a smooth transition region into the port tubes and a gradually tapered tip at the rear outside tubes 17 and 18. Gradually reducing the cross sectional area of the port tubes helps keep the air flow laminar and causes the port tubes to function as a low pass filter which helps confine high frequency noise inside the enclosure. Thereafter, the air stream diverges. It is preferable to cantilever the bullets 21 and 22 as shown without introducing supports in the region between bullet and tube because the supports might tend to distort the laminar flow and thereby introduce undesired audible effects.

The air confined in each port tube 18 may be regarded as an acoustic mass in series with the air in each cavity which may be regarded as an acoustic compliance in parallel with three other acoustic compliances each resonated by four times the effective acoustic mass of the associated port tube to establish a cavity-port tube resonance at substantially 40 Hz, the same frequency at which the cavity defined by cylindrical member 51 and port tube 23 are resonant. At relatively few Hertz below the fundamental resonance, typically below 32 Hz, the active equalizer sharply curtails the electrical power to the drivers because applying increasing levels of electrical power to the drivers at these frequencies would produce additional deflection of the cone that might well extend into the nonlinear region without providing appreciable audible acoustic power. Accordingly, a feature of the invention is to arrange the active equalizer so that there is a sharp decrease in response as a function of frequency below about 32 Hz, typically 18 db per octave. It may be advantageous to cut off sharply below the fundamental cavity-port tube resonance of 40 Hz to maximize dynamic range without significant loss of reproduced spectral components present in most music. The choice of 32 Hz still provides adequate dynamic range while facilitating reproduction of very low bass components present in some music.

It is also desirable to sharply reduce the response of the equalizer above the highest audible frequency of 15 kHz to prevent spurious inaudible signals from overloading the amplifiers or speakers and thereby effectively increase the dynamic range of the reproducing system for audible frequencies.

The active equalizer according to the invention also is arranged to help obtain optimum performance in the presence of varying room acoustics and speaker placement in different listening rooms. The treble frequency contour control adjusts the high frequencies to compensate for materials that might affect the high frequency absorption of the room or for curtains or other lightly absorbing materials that might be located on the wall behind the speakers where complete reflection at these frequencies is preferred. The mid-bass control adjusts for those frequencies most affected by placing the [apeaker] *speaker* in different locations in the room and for different amounts of mid-bass absorbing materials in the room.

As indicated above, in a multiple-driver loudspeaker system where the drivers operate in the same frequency range and share a common cavity having one or more port tubes or drone cones, there is a potential instability associated with variations in the characteristics between drivers. The problem may occur essentially in the frequency range between resonance of the cavity acoustic compliance with the port tube or drone cone acoustic mass, typically about 40 Hz, and the fundamental resonance of the loudspeaker system, determined by enclosure volume and driver electromechanical characteristics, typically about 150 Hz. Consider the two-driver case represented in FIG. 9 with drivers 71 and 72 connected in phase and electrical forces $F_x$ and $F_y$ applied to drivers 71 and 72, respectively, driving the cones inward. If driver 72 is stronger so that the force $F_y$ is greater than the force $F_x$, the pressure inside cavity 73 may cause the cone of driver 71 to move outward in phase opposition to the movement of the cone of driver 72. In extreme cases the voice coil on driver 71 may be driven completely outside the air gap, and this excessive motion will cause undesirable distortion, reduction in maximum bass output and potential early failure of the driver. Although this problem may also be encountered in unported systems, the problem is more severe in ported or drone cone systems in which the drivers operate over the low audio frequency range where the port or drone cone is effective in increasing the pressure on the cones. One means for preventing the in-phase-connected drivers from having one or more cones move in phase opposition to the other or others is to divide the enclosure into separate cavities to reduce coupling as described above. Another means comprises using drivers with stiff spiders, a less preferred approach because drivers with stiff spiders are hard to control and lower the bass efficiency of the system.

Another advantageous approach involves controlling the Q of the resonant system comprising the acoustic compliance of the cavity and the acoustic mass of the port tubes or drone cones. The differences between drivers $(F_y-F_x)/F_x$ which can be tolerated depend directly upon spider stiffness, cavity volume and inversely upon the number of drivers in excess of one, atmospheric pressure, the square of the area of the cones and $Q+1$, where Q is related to the sharpness of the port tube-cavity resonance. If the enclosure compliance has a pair of complex zeros associated with the port tube, which can be determined by solving an equation of the form $$s^2+\omega_0 s/Q+\omega_0^2,$$

Q may be defined as shown in the equation. The Q is strictly a function of the enclosure and port tube or drone cone parameters, and does not depend significantly upon driver characteristics. The Q may be lowered by restricting the flow of air in the port tube, for example, by inserting a piece of open-cell foam in the port tube or fuzzing the inside of the port tube 72 with a flocking material 72. Alternatively, the inside of the cavity may be arranged to dissipate energy or combinations of increased dissipation in the cavity and port tube or drone cone. This damping increases the stability of the system and increases the tolerable driver variations without having undesired out-of-phase driver cone movement.

A function of port tube 75 is to lower the excursion of the drivers to reduce distortion in a frequency range around the cavity-port tube resonance. The Q may be lowered from values typically as high as 5 to 20 down to one or two to increase stability while retaining the advantage of the port tube in reducing distortion.

While the preferred form of the invention uses port tubes to provide the effective acoustic mass for resonating with the acoustic compliance of the cavity, it is within the principles of the invention to use a drone cone speaker as a substitute for one or more port tubes for the various embodiments of the invention. In the embodiment of FIG. 9 the damping means may be applied on the drone cone and might comprise foam material at the periphery or roll of the cone or other suitable material having a damping effect.

The equation relating the tolerable force differences is given by:

$$F_y/F_x \approx 1 + V_o K_s/(N-1)(Q+1)P_o A^2$$

where:

$V_o$ is the enclosure volume, $K_s$ is the driver spider stiffness,

N is the number of drivers,

Q is as defined above, $P_o$ is atmospheric pressure, and

A is the area of the driver cones.

It is preferred that the means for damping be inserted in the port tube or drone cone where velocity is relatively high and relatively easy to resist for producing the desired Q-reducing dissipation. However, damping may also be introduced in the cavity, preferably by means responsive to pressure because pressure is relatively high, such as movable sides supported in dash pots or by other suitable dissipative means.

An exemplary embodiment of this form of the invention involved modifying the commercially available BOSE 800 professional loudspeaker system having eight in-phase-connected drivers on the two angled panels and none on the opposite flat panel in a cabinet 13 inches high by 20 inches wide by 12 inches deep with an internal volume of substantially 1800 in.$^3$ and a port tube venting through the center of each angled panel of diameter 2¾ inches and length 9 inches each having an inch length of open cell urethane foam spanning the tube opening of density of 10 pores per inch. Its appearance is substantially as seen in FIG. 5 without the bullets and the central port. The cavity acoustic compliance-port tube acoustic mass resonance was substantially 50 Hz and the fundamental resonance of the loudspeaker system substantially 120 Hz.

[It] *If* desired a single shorter port tube may be used and the port tube or tubes may vent through the side panels of the enclosure or the flat panel opposite the angled panels. Venting through the angled panels is preferred because the side and flat panels may be the sides of a weather-resistant carrying case with the angled panels covered by a cover making a substantially fluid-tight seal with the rest of the case when transporting the system.

In an exemplary embodiment of the invention shown in FIGS. 1–5 the plastic ports are preferably made of impact polystyrene such as Monsanto 4200, the width of the assembly is substantially 21 inches wide, 12⅜ inches high and substantially 13 inches deep. The volume of each cavity is substantially 177 cubic inches. Port tubes 17 and 18 are substantially 9.5 inches long, have an inside diameter of 1.62 inches and outside diameter of 1.82 inches at the rear end, an inside diameter of substantially 2.42 inches at the front end with the outside diameter of the folded over lips being substantially 3.62 inches and the folded over portion being substantially 1.00 inches. Center port tube 23 typically has an inside diameter of 0.65 inch and outside diameter of 0.85 inch and is substantially 9 inches long, substantially half of that length extending inside cylindrical member 51 whose inside diameter is substantially 6 inches and length to the portion that tapers inwardly at an angle of substantially 30° being 6 3/16 inches. Front baffle 24 is preferably curved along a radius of 35.5 inches.

The loudspeaker drivers are 4½ inches and may be of the high-compliance type used in the BOSE 901 loudspeaker each having a voice coil impedance of substantially 8 ohms connected in series-parallel with three drivers in each bank to provide a nominal impedance of substantially 8 ohms; however, the drivers are preferably high-compliance drivers having a nominal voice coil impedance of 0.9 ohm established by a single-layer edge-wound rectangular aluminum wire voice coil connected in series and used in the BOSE 901 series III loudspeaker commercially available at the time this patent is granted, which driver is described in pending application Ser. No. 718,112, now U.S. Pat. No. 4,061,890, granted Dec. 6, 1977.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited soley by the spirit and scope of the appended claims.

What is claimed is:

1. A loudspeaker system comprising, means defining an enclosure for accommodating a plurality of like high-compliance loudspeaker drivers characterized by potential instability associated with variations of the characteristics between drivers when operating in the same frequency range and sharing a common cavity with one or more port tubes or drone cones, cavity defining means formed with a corresponding plurality of driver openings each for accommodating a respective loudspeaker driver and characterized by acoustic compliance, said loudspeaker drivers each seated in a respective one of said driver openings and connected in phase, said cavity defining means having at least one mass opening for accommodating means for providing acoustic mass that resonates with said acoustic compliance at a predetermined mass-compliance resonant frequency in the low range of audio frequencies, said means for providing acoustic mass seated in a respective mass opening, said cavity defining means being constructed and arranged to provide an air channel common to all said loudspeaker drivers, and means for preventing the cones of said loudspeaker drivers from exhibiting out-of-phase movement when said loudspeaker drivers are connected in phase and energized with an electrical signal having spectral components in the low range of audio frequencies embracing and near said mass-compliance resonant frequency.

2. A loudspeaker system in accordance with claim 1 wherein the embracing frequency range is from just below said predetermined frequency to the fundamental resonance of said loudspeaker system related to the volume of said cavity defining means and the electromechanical parameters of said loudspeaker drivers.

3. A loudspeaker system in accordance with claim 1 wherein said cavity defining means defines a cavity for each driver adjacent to a respective driver opening and said means for providing acoustic mass comprises common port tube means for venting said cavities outside said enclosure and further comprising, aperture defining means defining a coupling aperture between each cavity and said common port tube means of cross sectional area small enough to provide substantial acoustic isolation between adjacent cavities at low bass frequencies and large enough to transmit air therethrough at said low bass frequencies for coupling each cavity to said common port tube means.

4. A loudspeaker system in accordance with claim 3 wherein the volume of each of said cavities is substantially the same.

5. A loudspeaker system in accordance with claim 1 and further comprising, active equalizing means including means for coupling signal spectral components of substantially the full range of audio frequencies to the in-phase-connected drivers, means for establishing a substantially uniform radiated power response of said system as a function of frequency at least in the range of frequencies between said predetermined mass-compliance resonant frequency and the fundamental resonance of said system, and means for sharply attenuating signal spectral components below a predetermined frequency at or slightly below said predetermined mass-compliance resonant frequency.

6. A loudspeaker system in accordance with claim 5 wherein said means for establishing includes means for establishing a substantially uniform radiated power response as a function of frequency of said system for substantially the full range of audio frequencies.

7. A loudspeaker system in accordance with claim 5 wherein the attenuation imparted to signal spectral components by said means for sharply attenuating below said predetermined frequency is at least substantially 18 db per octave.

8. A loudspeaker system comprising, means defining an enclosure for accommodating a plurality of like loudspeaker drivers, cavity defining means formed with a corresponding plurality of driver openings each for accommodating a respective loudspeaker driver and characterized by acoustic compliance, said cavity defining means having at least one mass opening for accommodating means for providing acoustic mass that resonates with said acoustic compliance at a predetermined mass-compliance resonant frequency in the low range of audio frequencies.

means for preventing the cones of said loudspeaker drivers from exhibiting out-of-phase movement when said loudspeaker drivers are connected in phase and energized with an electrical signal having spectral components in the low range of audio frequencies embracing and near said mass-compliance resonant frequency, wherein said cavity defining means defines a cavity for each driver adjacent to a respective driver opening and said means for providing acoustic mass comprises common port tube means for venting said cavities outside said enclosure and further comprising aperture defining means defining a coupling aperture between each cavity and said common port tube means of cross sectional area small enough to provide substantial acoustic isolation between adjacent cavities at low bass frequencies and large enough to transmit air therethrough at said low bass frequencies for coupling each cavity to said common port tube means, and wherein said driver openings are on the rear of said enclosure and further comprising, at least another port tube means, said cavity defining means defining at least another cavity adjacent to a driver opening at the front of said enclosure and connected to said another port tube means.

9. A loudspeaker system in accordance with claim 8 wherein all said port tube means vent to the rear.

10. A loudspeaker system in accordance with claim 8 and further comprising, a plurality of like loudspeaker drivers connected in phase each seated in a respective one of said driver openings.

11. A loudspeaker system in accordance with claim 8 wherein the volume of each of said cavities is substantially the same.

12. A loudspeaker system comprising, means defining an enclosure for accommodating a plurality of like loudspeaker drivers, cavity defining means formed with a corresponding plurality of driver openings each for accommodating a respective loudspeaker driver and characterized by acoustic compliance, said cavity defining means having at least one mass opening for accommodating means for providing acoustic mass that resonates with said acoustic compliance at a predetermined mass-compliance resonant frequency in the low range of audio frequencies, means for preventing the cones of said loudspeaker drivers from exhibiting out-of-phase movement when said loudspeaker drivers are connected in phase and energized with an electrical signal having spectral components in the low range of audio frequencies embracing and near said mass-compliance resonant frequency, said means for providing acoustic mass seated in a respective mass opening and comprising port tube means for venting said cavity means outside said port tube means including means defining a tapered annular hollow region for establishing substantially laminar airflow therein.

13. A loudspeaker system in accordance with claim 12 wherein said means defining an annular region comprises a bullet cantilevered from a member forward of said port tube means.

14. A loudspeaker system in accordance with claim 13 wherein said bullet extends through the entire length of said port tube means.

15. A loudspeaker system comprising, means defining an enclosure for accommodating a plurality of like loudspeaker drivers, cavity defining means formed with a corresponding plurality of driver openings each for accommodating a respective loudspeaker driver and characterized by acoustic compliance, said cavity defining means having at least one mass opening for accommodating means for providing acoustic mass that resonates with said acoustic compliance at a predetermined mass-compliance resonant frequency in the low range of audio frequencies, means for preventing the cones of said loudspeaker drivers from exhibiting out-of-phase movement when said loudspeaker drivers are connected in phase and energized with an electrical signal having spectral components in the low range of audio frequencies embracing and near said mass-compliance resonant frequency, said cavity defining means defining a cavity for each driver adjacent to a respective driver opening and said means for providing acoustic mass comprising common port tube means for venting said cavities outside said enclosure, aperture defining means defining a coupling aperture between each cavity and said common port tube means of cross sectional area small enough to provide substantial acoustic isolation between adjacent cavities at low bass frequencies and large enough to transmit air therethrough at said low bass frequencies for coupling each cavity to said common port tube means, wherein said common port tube means includes means defining a tapered annular hollow region for establishing substantially laminar airflow therein.

16. A loudspeaker system in accordance with claim 15 wherein said means defining an annular region comprises a bullet cantilevered from a member forward of said common port tube means.

17. A loudspeaker system in accordance with claim 16 wherein said bullet extends through the entire length of said common port tube means.

18. A loudspeaker system in accordance with claim 17 wherein said port tube means is formed with a folded over lip facing the forward member adjacent each aperture for establishing smooth air flow at the entrance of said port tube means.

19. A loudspeaker system in accordance with claim 18 wherein there are four of said cavities surrounding said common port tube means and each of said coupling apertures is located between said lip and said forward member and embraces an angle of substantially 90° about the axis of said common port tube means,

20. A loudspeaker system in accordance with claim 19 and further comprising a second of said common port tube means formed with a folded over lip facing said forward member with an additional four of said cavities surrounding said second common port tube means with a coupling aperture between each of the latter cavities and said second common port tube located between the latter lip and said forward member and embracing an angle of substantially 90° about the axis of said second common port tube means.

21. A loudspeaker system in accordance with claim 20 wherein the eight cavities extend between said front member and respective rear angled baffles forming an obtuse angle with each other.

22. A loudspeaker system in accordance with claim 21 and further comprising at least a third port tube means, said cavity defining means defining a ninth cavity adjacent to a driver opening in said front member, said third port tube means being for venting said ninth cavity to the outside of said enclosure and extending from said ninth cavity through an opening embracing the junction between said rear angled panels.

23. A loudspeaker system in accordance with claim 22 and further comprising loudspeaker drivers connected in phase seated in each of said driver openings.

24. A loudspeaker system in accordance with claim 23 and further comprising, active equalizing means including means for coupling signal spectral components of substantially the full range of audio frequencies to the in-phase-connected drivers, means for establishing a substantially uniform radiated power response of said system as a function of frequency at least in the range of frequencies between said predetermined mass-compliance resonant frequency and the fundamental resonance of said system, and means for sharply attenuating signal spectral components below a predetermined frequency at or slightly below said predetermined mass-compliance resonant frequency.

25. A loudspeaker system in accordance with claim 24 wherein said means for establishing includes means for establishing a substantially uniform radiated power response as a function of frequency of said system for substantially the full range of audio frequencies.

26. A loudspeaker system in accordance with claim 24 wherein the attenuation imparted to signal spectral components by said means for sharply attenuating below said predetermined frequency is at least substantially 18 db per octave.

*27. A loudspeaker system comprising,*

*means defining an enclosure for accommodating at least one loudspeaker driver,*

*said enclosure including cavity defining means formed with at least one driver opening for accommodating said loudspeaker driver and characterized by acoustic compliance,*

*said loudspeaker driver being seated in said driver opening,*

*said cavity defining means also having at least one mass opening for accommodating means for providing acoustic mass that resonates with said acoustic compliance at a predetermined mass-compliance resonant frequency in the low range of audio frequencies,*

*said means for providing acoustic mass seated in said mass opening,*

*said loudspeaker system having a fundamental resonance determined by the volume of said enclosure and the electromechanical characteristics of said driver at a frequency significantly higher than said predetermined mass-compliance frequency,*

*and active equalizing means including means for establishing a substantially uniform radiated power response of said system as a function of frequency at least in the range of frequencies between said predetermined mass-compliance resonant frequency and said loudspeaker system fundamental resonance, and means for sharply attenuating signal spectral components below a predetermined frequency at or slightly below said predetermined mass-compliance resonant frequency.*

*28. A loudspeaker system in accordance with claim 27 wherein said loudspeaker system fundamental resonance is at least twice said predetermined mass-compliance resonant frequency.*

*29. A loudspeaker system in accordance with claim 5 wherein the fundamental resonance of said system is at least twice said predetermined mass-compliance resonant frequency.*

*30. A loudspeaker system comprising,*

*means defining an enclosure for accommodating at least one loudspeaker driver,*

*said enclosure including cavity defining means formed with at least one driver opening for accommodating said loudspeaker driver and characterized by acoustic compliance,*

*said loudspeaker driver being seated in said driver opening,*

*said cavity defining means also having at least one opening for accommodating means for providing acoustic mass that resonates with said acoustic compliance at a predetermined mass-compliance resonant frequency in the low range of audio frequencies,*

*said means for providing acoustic mass seated in said mass opening and comprising port tube means for venting said cavity means outside said enclosure,*

*said port tube means including means defining a tapered annular hollow region for establishing substantially laminar airflow therein.*

*31. A loudspeaker system in accordance with claim 30 wherein said port tube means has an inside end inside said enclosure and an outside end adjacent to the region outside said enclosure and said means defining an annular region comprises a bullet cantilevered from a member that is nearer said inside end than said outside end of said port tube means.*

*32. A loudspeaker system in accordance with claim 31 wherein said bullet extends through the entire length of said port tube means.*

*33. A loudspeaker system in accordance with claim 27 wherein said loudspeaker driver is a full-range driver.*

* * * * *